W. F. DOERFLINGER.
METHOD OF PRODUCING HYDRATES OF STANNIC CHLORID.
APPLICATION FILED JUNE 27, 1911.
1,055,727.
Patented Mar. 11, 1913.
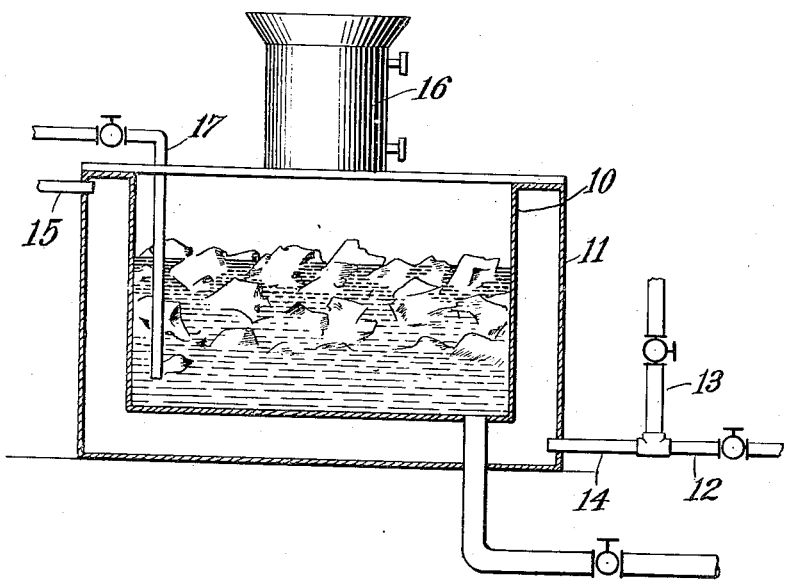

UNITED STATES PATENT OFFICE.

WILLIAM F. DOERFLINGER, OF HUNTINGTON, NEW YORK, ASSIGNOR, BY MESNE ASSIGNMENTS, TO NIAGARA ALKALI COMPANY, A CORPORATION OF NEW YORK.

METHOD OF PRODUCING HYDRATES OF STANNIC CHLORID.

1,055,727.     Specification of Letters Patent.     Patented Mar. 11, 1913.

Original application filed February 5, 1908, Serial No. 414,299. Divided and this application filed June 27, 1911. Serial No. 635,618.

*To all whom it may concern:*

Be it known that I, WILLIAM F. DOERFLINGER, a citizen of the United States, residing at Huntington, county of Suffolk, and State of New York, have invented certain new and useful Improvements in Methods of Producing Hydrates of Stannic Chlorid, of which the following is a full, clear, and exact description.

This application is a division of my pending application Serial No. 414,299, filed February 5th, 1908.

In producing stannic chlorid hydrates the combination of the water and the anhydrous stannic chlorid is very violent unless particular precautions be observed even when conducted with external cooling. I have found that this violent action may be obviated by my method of operation as herein described, whereby the operation is made safe and quiet, and is always entirely under the operator's control.

I place in a vessel provided with jacketed walls a part of the water necessary to form the desired amount of hydrate, in the form of ice, and then run in the anhydrous bichlorid, which may have been previously cooled. The amount of ice is regulated so that the heat of reaction will not be sufficient to raise the entire mass above a predetermined degree. In general I prefer to keep the temperature well below 50° C. When the ice is all melted, or while it is melting, I circulate a cooling medium through the jacket and reduce the temperature to say 0° C., then I gradually add the rest of the ice, necessary to form the desired quantity of hydrate, at such rate that the temperature never rises above the desired point. Near the end of the addition I allow the temperature to rise gradually above the melting point of the hydrate, even aiding the melting by circulating warm fluid through the jacketed walls if necessary. When the hydrate is all melted, and the contents of the vessel have become uniform throughout, I run the hydrate off into molds to cool and set. It can then be marketed in such form, or it can be ground and sold as crystalline powder, or dissolved in water and sold as an aqueous solution. As a specific example of producing say pentahydrate, I place 60 lbs. of ice in a vessel with jacketed walls, and run in upon the ice 743.5 lbs. of anhydrous bichlorid, previously cooled to 0° C. During the addition I circulate brine in the jacket at a temperature of −10° C. When no more heat is evolved, and the temperature has got to about 0° C., I gradually add 196.5 lbs. more ice, keeping the temperature down by the flow of cooling brine in the jacket. At the end I allow the temperature to rise to about 5° C. above the melting point of the hydrate, which is substantially 40° C., allow it to become uniform throughout, and then run it off into molds to solidify. This specific case is given merely by way of example and as the preferred mode of operation, this part of the invention consisting, generally, in admixing all or part of the water, necessary to form hydrate from anhydrous stannic chlorid, in the form of ice, and dissipating more or less of the heat, evolved by the reaction, by means of the latent heat of fusion of the ice, thus avoiding overheating either local or general.

It will be understood, of course, that in practising my method any suitable apparatus may be employed. In the annexed drawing I have illustrated, somewhat diagrammatically, a simple and convenient apparatus for the purpose. The figure is a section of the vessel in which the stannic chlorid is converted into hydrate.

The liquid anhydrous stannic chlorid delivered from the finisher, as described in my copending application above referred to, may be marketed in such form, but it is preferable first to convert it into a hydrate, for example penta-hydrate. For this purpose I provide a vessel 10 having a jacket 11; a cooling medium from pipe 12, or a heating medium from pipe 13, being delivered thereto through a pipe 14 and discharged through an outlet pipe 15. The ice which is used in making the hydrate is placed in the vessel 10 through a suitable opening 16 provided therefor, and the liquid anhydrous bichlorid is admitted through a pipe 17 extending to the bottom of the vessel.

What I claim is as follows:—

1. In the production of hydrates of stannic chlorid, the step which consists in admixing liquid anhydrous stannic chlorid with water in the form of ice, as set forth.

2. In the production of hydrates of stannic chlorid, the steps which consists in admixing liquid anhydrous stannic chlorid with water in the form of ice, and melting and conducting off the resulting hydrate.

3. In the process of producing compositions of stannic chlorid and water from liquid anhydrous stannic chlorid, the step which consists in dissipating a portion of the heat evolved by the reaction between stannic chlorid and water by the latent heat of fusion of water in the form of ice in intimate contact with the anhydrous stannic chlorid, said water entering into the composition of stannic chlorid hydrate as a component thereof.

In testimony whereof I affix my signature in the presence of two subscribing witnesses.

WILLIAM F. DOERFLINGER.

Witnesses:
   WM. BOHLEBER,
   M. LAWSON DYER.